June 9, 1931. J. E. HAYNES 1,808,848
TRIPOD
Original Filed April 3, 1928
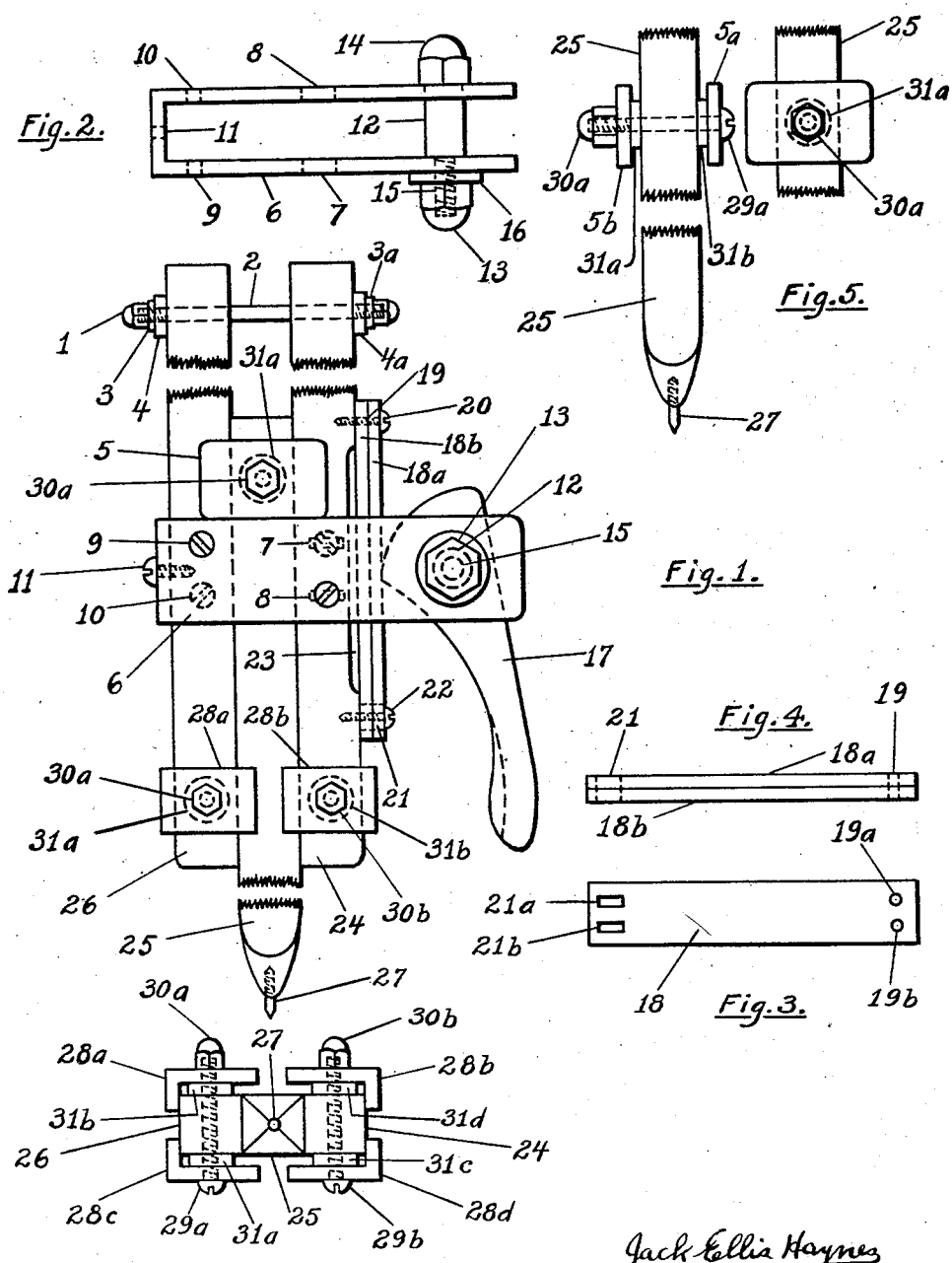
WITNESSES
Elliott Wellington Hunter
Edward Martin Allen
Jack Ellis Haynes
INVENTOR.
BY Arvid Reuterdahl
ATTORNEY.

Patented June 9, 1931

1,808,848

UNITED STATES PATENT OFFICE

JACK ELLIS HAYNES, OF ST. PAUL, MINNESOTA, ASSIGNOR TO HAYNES EQUIPMENT CORPORATION, OF ST. PAUL, MINNESOTA, A CORPORATION OF MINNESOTA

TRIPOD

Original application filed April 3, 1928, Serial No. 267,108. Divided and this application filed December 30, 1929. Serial No. 417,544.

My invention relates to improvements in tripods whose purpose is the support of cameras, transits, levels, plane tables, instruments of precision and observation, and all other types of instruments, devices and machines. This application is a division of my co-pending application filed April 3, 1928, Serial Number 267,108 for tripods.

The objects of my improvement are, first, the increasing of the supporting rigidity of the tripod legs to a maximum; second, the simple and rapid clamping of the tripod legs into the desired position; third, the reduction of wear on all the constituent parts to a minimum; fourth, the provision of automatic means of compensating for wear; fifth, the distribution of all the resultant forces of compression and pressure, due to clamping, over large areas; sixth, the increasing of the rigidity of the tripod legs to a maximum, when fully extended; seventh, the prevention of breakage of said tripod legs when fully extended; eighth, the prevention of disassembly and loss of parts; ninth, the correct application of compression and pressure, along the proper stress lines, to those surfaces which are best adapted to transmit and react against said forces; tenth, the even and effective distribution of all the resultant compressions and pressures; eleventh, the avoiding of the inconveniences incident to non-integral tripod assemblies; and twelfth, the setting of tripod legs above the level of the tripod head as may be required by the topography of cliff and mountain slopes.

I attain these objects by the devices illustrated in the accompanying drawings, in which—

Figure 1 is a vertical view of the essentials of a tripod leg assembly; Fig. 2, a horizontal or plan view of a leg clamp band showing a cam pin; Fig. 3, a vertical view of a cam pressure plate assembly; Fig. 4, an end view of the edge of a cam pressure plate assembly; and Fig. 5, is a detail of a sliding guide plate.

Similar numerals refer to similar parts throughout the several views.

The lug bolt assembly which is used in attaching a tripod leg to a lug, is shown in the upper detached portion of Fig. 1. This assembly consists principally of a bolt 1 whose pin 2 is threaded for the engagement of a nut at either or both ends, lock washers 3, and plain washers 4. The purpose of lock washers 3 is to prevent the lug bolt assembly from becoming loose on account of the wear on the constituent parts. Lock washers 3 and 3a are preferably in the form of split spirals. They may, however, be of any suitable form that permits the lug bolt assembly to be securely tightened in order to take up the losses due to wear. This is an important feature in the continuous use of my invention.

In the lower detached portion of Fig. 1, I show a sliding guide plate 5 and the leg clamp assembly, which consists principally of a leg clamp band 6, cam pin 12, and hand cam 17. Leg clamp band 6 and cam pin 12 are shown in plan view in Fig. 2. The clamp band 6 is attached to the tripod leg members 24 and 26 by means of screws or other suitable means. It contains slot apertures 7 and 8 as shown in Figures 1 and 2. The purpose of said slot apertures is to permit compression of tripod leg members 24, 25, and 26, by the pressure which is applied to said tripod leg members, first, through the hand cam action; and second, to cam pressure plate assembly 18a and 18b. Two views of said cam pressure plate assembly are shown in Figures 3 and 4. Said cam pressure plate assembly is composed, preferably, of spring plates which yield firmly under the pressure exerted by hand cam 17. I do not limit myself to the use of two plates, since one or more are within the scope of my invention. Relative motion between the tripod leg members and leg clamp band 6 is permitted by slot apertures 7 and 8 which are preferably staggered, as shown, in order to insure the firm hold in tripod leg member 24, of the screws which engage such apertures.

Cam pressure plate assembly 18a and 18b detailed in Figures 3 and 4, is shown attached to tripod leg member 24 by screws 20 and 22. I do not confine myself to this particular method of attachment. In order to permit relative motion between cam pressure plates 18a and 18b and tripod leg member 24, slot apertures 21a and 21b are provided as shown in Figures 1, 3 and 4. The action of the cam pressure plate is further facilitated by the indentation or notch 23 which is provided in tripod leg member 24. Although this is the preferable manner of construction, I do not confine myself to its exclusive use, because good results may be obtained even if said notch 23 is omitted. It is evident that wear, due to the action of hand cam 17, is automatically compensated by means of notch 23, and slot apertures 21a and 21b, in conjunction with the disposition and design of the parts. The pressure generated by the action of hand cam 17 is carried to two supporting surfaces, of ample area, which are adjacent to indentation notch 23.

An examination of the design of the leg clamp assembly shows that tripod leg members 24, 25 and 26 may be compressed into secure and unyielding contact by a slight pressure upon hand cam 17 in the direction of tripod leg member 24. A slight outward pull upon said hand cam, away from said leg member, releases the pressure. The reason for this efficacious, simple and speedy action is due to the unique arrangement and design of the various parts of the leg clamp assembly. The hand cam 17 is a combination lever and cam by means of which a great pressure can be quickly applied with a minimum of effort. Moreover, the compressive action is directed, in my leg clamp assembly, in the proper direction for the attainment of the desired result. It is evident that compression along the contact surfaces between tripod leg members 24, 25, and 26, cannot be efficiently produced by any device which transmits the generated pressue in a direction which is parallel to said contact surfaces. Screws, or other similar devices, wherever applied, cannot spread the pressure as effectively as hand cam 17 whose pressure surface is of the same length as cam pin 12. Moreover, in my invention, the pressure is not only exerted over a large area, but it is also applied in a direction which is perpendicular, or normal, to the contact surfaces between tripod leg members 24, 25 and 26.

Another important feature of my invention consists in the introduction of a shoulder in the design of cam pin 12, as shown in Figure 2. The diameter of cam pin portion 12 is larger than its threaded part 15 which engages the nut 13, as shown. The difference in these two diameters provides a ring-like surface, or shoulder, which is in engaging contact with the inner surface of leg clamp band 6. By this means I secure the free motion of hand cam 17 without, in any way, disturbing the tightness and solidity of the leg clamp assembly. Moreover, the motion of the cam pin 12 is also prevented by the same means. Furthermore a large cylindrical area is provided in cam pin 12, for engaging the corresponding rotary area presented by the bounding surface of the cylindrical hole in hand cam 17. I compensate for wear in said leg clamp assembly, by introducing lock washer 16 between leg clamp band 6 and cam pin nut 13. Said lock washer automatically compensates for wear in this part of my device. I do not confine myself to the use of only one lock washer. In fact, lock washers may be introduced both at the bolt head and nut end of the cam pin.

The usual leg shoe, consisting of the pointed screw 27, is employed in conjunction with sliding tripod leg 25. I do not claim invention either in the case of leg shoe 27, or of sliding guide plate 5, which serves as a traveling guide and a stop which engages leg clamp band 6, thus preventing tripod leg member 25 from being pulled completely out of the tripod leg.

The leg guide assembly 28a, b, c, and d serves the purpose of producing maximum rigidity in the leg assembly when the sliding leg 25 is fully extended. Screws 29 are threaded into plates 28a, b, c and d, thus making an integral construction which does not fall apart when lock nuts 30a, and b are unscrewed. Washers 31 are introduced for clearance.

Any method or suitable material which can be used to produce the intent of this invention comes within its legitimate scope. Moreover, I do not limit myself to the precise form of the various members and parts of my device except, in so far, as their principle of operation is concerned. Furthermore, it is within the scope of my invention to increase or decrease the numbers of its auxiliary parts and members, in conformity with the general intent of the device as shown and described.

Having thus described my invention I claim:

1. A tripod leg assembly comprising a pair of leg members spaced apart, an intermediate leg member slidably arranged between the lower end portions of the first named leg members for longitudinal movement and provided on opposite sides with plates which bear on said spaced leg members, a U-shaped yoke extending across and enclosing said leg members and secured to one of the first named leg members for movement relative thereto in a direction transverse thereof, a cam pressure plate assembly on the outer side of one of said first named leg members, a manually operable cam pivotally mounted in said yoke and bearing against said cam pressure plate assembly, and leg guides secured to the outside leg members.

2. A tripod leg assembly as claimed in claim 1, in which said cam pressure plate assembly consists of spring plates having their ends attached to one of the spaced leg members and said leg member has a recess opposite the central portion of said cam pressure plate assembly to permit flexing of the latter by the action of the cam.

JACK ELLIS HAYNES.